C. W. ZIMMERMAN.
CORN PLANTER.
APPLICATION FILED JUNE 26, 1915.
1,175,329.
Patented Mar. 14, 1916.
2 SHEETS—SHEET 1.
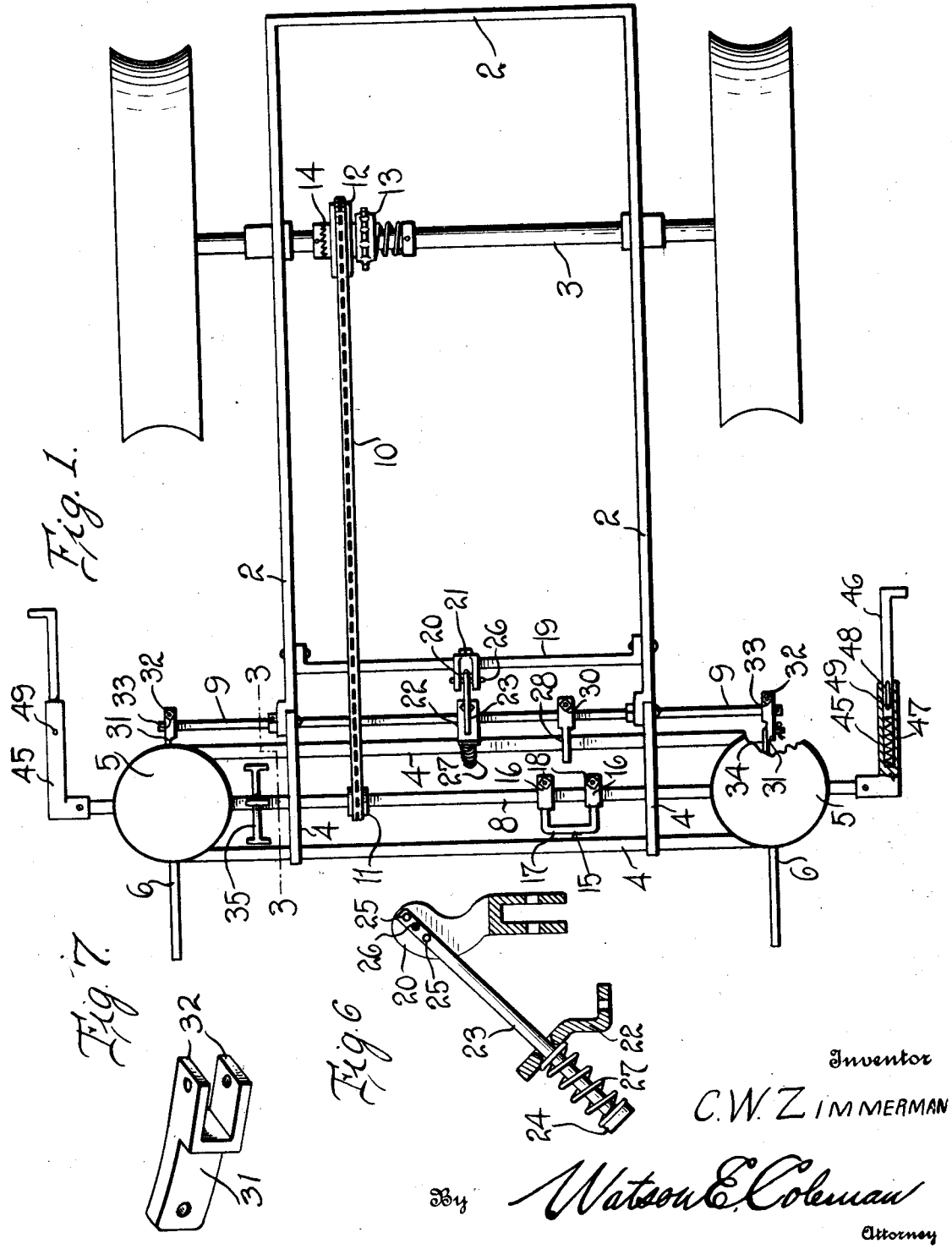

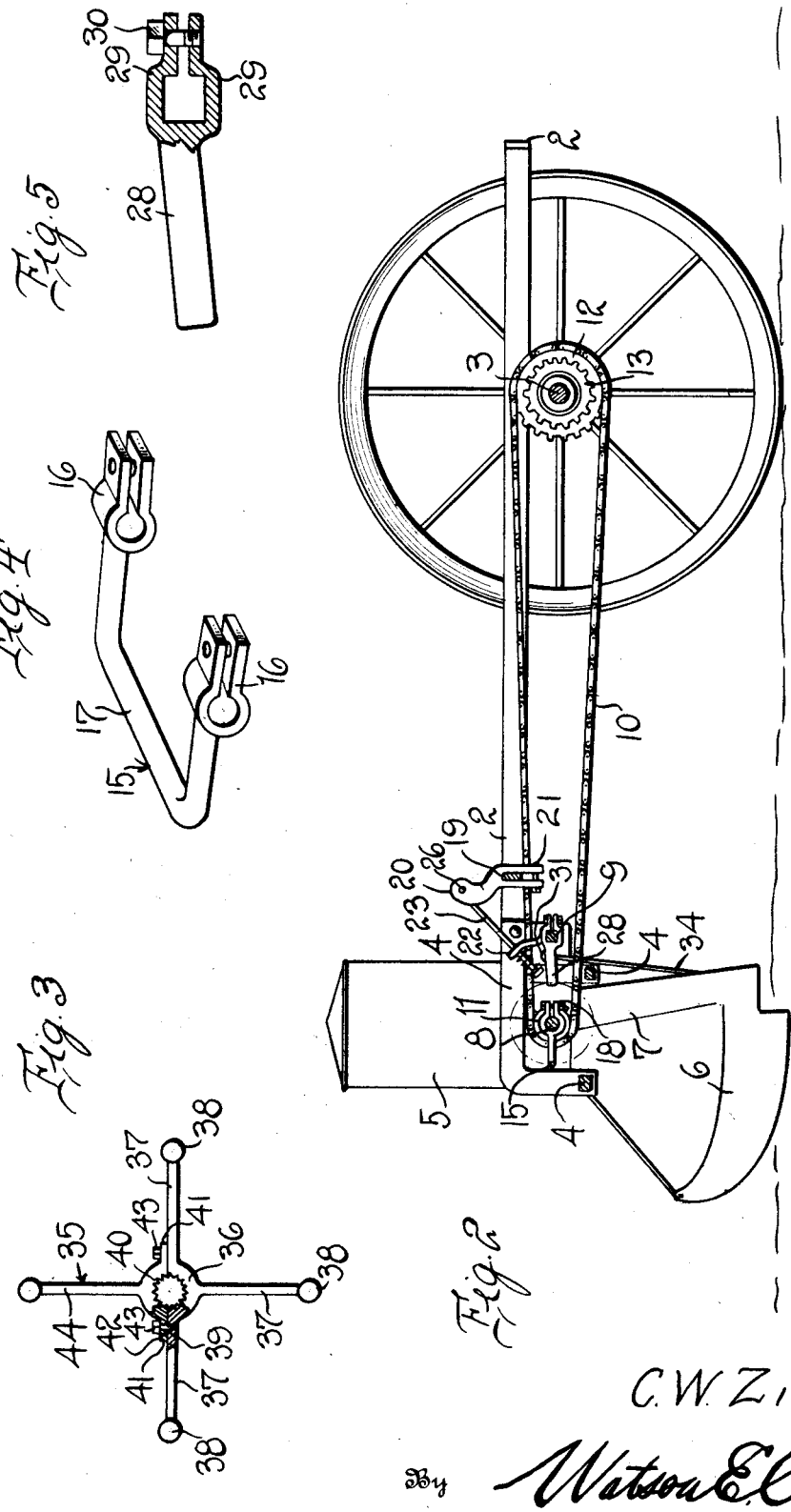

UNITED STATES PATENT OFFICE.

CHARLES W. ZIMMERMAN, OF REBERSBURG, PENNSYLVANIA.

CORN-PLANTER.

1,175,329.  Specification of Letters Patent. Patented Mar. 14, 1916.

Application filed June 26, 1915. Serial No. 36,503.

*To all whom it may concern:*

Be it known that I, CHARLES W. ZIMMERMAN, a citizen of the United States, residing at Rebersburg, in the county of Center and State of Pennsylvania, have invented certain new and useful Improvements in Corn-Planters, of which the following is a specification, reference being had to the accompanying drawings.

My invention relates to planters for planting corn or other seed, and particularly to attachments adapted to be applied to a check row corn planter. The necessity of using a check row wire may be done away with, and the planter converted into a wireless check row planter.

The primary object of my invention is the provision of very simple attachments whereby the above result may be secured, and further by the provision of means whereby the initial dropping of the seed at the beginning of a row may be regulated.

A further object of the invention is to provide a set of attachments which is adapted to be applied to a large number of different makes of check row corn planters using wire for checking the rows and in which the several attachments shall be simple in construction, cheaply manufactured, and readily applied.

My invention is illustrated in the accompanying drawings, wherein:

Figure 1 is a plan view of a corn planter constructed in accordance with my invention and having my attachments applied thereto; Fig. 2 is a longitudinal section of the planter; Fig. 3 is a section on the line 3—3 of Fig. 1; Fig. 4 is a perspective detail view of the tappet member; Fig. 5 is an elevation, partly in section, of the tappet arm; Fig. 6 is an elevation, partly in section, of the means for yieldingly resisting the rotation of the valve shaft; Fig. 7 is a detail view of one of the arms for connecting the valve shaft to the seed valves.

In these drawings I have shown an ordinary corn planter having the frame 2, the rotatable axle 3, the front frame 4, the seed boxes or hoppers 5, and the runners 6 formed with the usual shanks 7 which extend up to the said hoppers and through which the seed is discharged. Mounted upon the front frame is the usual agitator and seed plate operating shaft 8. Also mounted upon the frame is the usual shaft 9 for controlling the dropping valves (not shown) in the shoes or runners 6. Rotation is communicated to the shaft 8 by the usual sprocket chain 10 passing over a front sprocket wheel 11 supported on the shaft 8 and at its rear end adapted to be engaged with either one of the sprocket wheels 12 and 13, these sprocket wheels being of different sizes, and one being adapted to cause the dropping of the corn every forty-two inches, and the other being adapted to drop corn every thirty-six inches. These sprocket wheels are loose upon the axle but are engaged therewith by means of clutch elements 14, one of which is mounted upon the axle and the other of which is operatively connected to the sprocket wheels.

All of the parts heretofore described, with the exception of the sprocket wheels 12 and 13 and the clutch 14, are common and well known and are those usually found in corn planters of this type. While it has been common to provide sprocket wheels and a clutch like the parts 12, 13 and 14, these parts differ from the ordinary sprocket wheels and clutches in the fact that one of these sprocket wheels is adapted to drop the corn every forty-two inches and the other sprocket wheel is adapted to drop the corn every thirty-six inches, and this the ordinary sprocket wheels as commonly used will not do. Furthermore, in the ordinary clutches there are only seven teeth, whereas in my construction the clutch is formed with nineteen teeth. My device as will be hereinafter described will not work with the sprocket wheels as ordinarily found on corn planters, as it will make a difference of twelve inches when you start on a hill with the sprocket wheels ordinarily used whereas the sprocket wheels which I have provided I have found by actual experience will start properly always.

My attachments include the tappet 15 which comprises oppositely disposed clamps 16 adapted to engage the shaft 8, these clamps being connected by the longitudinally extending integral rod 17. These clamps preferably are so formed as to embrace the shaft 8, and the ears of the clamps are connected by means of bolts 18. This clamp is particularly adapted to be used with a many-sided shaft. It may be adjusted upon any convenient portion of the shaft 8 and will of course rotate with the shaft.

Mounted upon a transversely extending bar 19, which is rigidly attached to the frame of the planter rearward of the shaft 9 and above this shaft, is a bifurcated arm 20 whose base is formed with oppositely disposed clamps adapted to embrace the bar 19, the base being held in engagement with the bar by the transversely extending bolt 21. Mounted upon the shaft 9 in any suitable manner so as to rotate therewith is an arm 22 perforated at its extremity for the passage of a rod 23. This rod at its lower end is headed, as at 24, and at its upper end passes between the bifurcation of the arm 20. The rod is provided with a plurality of perforations 25 in any one of which a pin 26 fits, this pin passing through the oppositely disposed ears forming the arm 20. A spring 27 surrounds the lower end of the rod 23 and is disposed between the head 24 and the arm 22. It will thus be seen that an oscillation of the shaft 9 in one direction will cause a compression of the spring, and that when this shaft is released this spring will cause the rotation of the shaft 9 to its original position.

The shaft 9 is rotated by the contact of the transversely extending bar 17 of the tappet 15 with the extremity of an arm 28 whose base is formed with clamping ears 29 which embrace the shaft 9 and are held in clamping engagement therewith by means of the bolt 30. This arm or finger 29 is slightly curved. It will thus be seen that the shaft 9 will be oscillated once for each rotation of the shaft 8 and that after the arm 29 has been depressed by its engagement with the member 15 the spring 27 will act to return the shaft 9 to its original position.

Detachably mounted upon the ends of the shaft 9 are the arms 31, each formed at its inner end with opposed clamping ears 32 through which passes a bolt 33, thus permitting these ears to be clamped rigidly upon the shaft 9. The end of each arm 31 is perforated for the reception of the angular end of the link 34, this link extending downward and being connected to the seed valve of the corresponding shoe or runner in the usual manner.

For the purpose of initially rotating the shaft 8 so as to bring the connecting bar 17 of the member 15 into a position more or less adjacent to the arm 28 and thus control the timing of the machine, that is, control the instant at which the seed dropping valves shall be operated, I mount upon the shaft 8 a turning wheel or handle. Inasmuch as my devices are intended to be applied to corn planters already in use and where it is impossible or inadvisable to remove the shaft 8 from its bearings for placing thereon the regular hand wheel, I so form this hand wheel that it may be clamped upon the shaft. As illustrated in Fig. 3, this hand wheel 35 is formed in two sections. One of these sections has a semi-circular portion 36 which fits around the shaft and which is interiorly toothed. From this semi-circular portion 36 project the three integral arms 37, each provided on its outer end with a head 38. The two arms which are in alinement with each other are formed with perforations 39. Coacting with the semi-circular section 36 is a semi-circular section 40 which is also interiorly toothed and has the outwardly projecting portions 41 confronting the arms 37 and likewise perforated, as at 42, for the passage of attaching bolts 43. This section 40 is also provided with a radially projecting arm 44 corresponding to the arm 37. By this hand wheel the shaft 8 may be readily turned in order to adjust the initial position of the parts 17 and 29.

For the purpose of providing a marker which may be used in connection with my seed planting mechanism to indicate where the corn is dropped, I provide detachable crank members 45 which are formed to be received each at one end of the shaft 8 and to be held in place upon the shaft and in proper angular relation by means of set screws. Each of these crank members 45 is preferably hollow, and telescoping through the extremity of the crank member is a rod 46, which, when forced downward, strikes the ground and makes a mark thereon. Preferably this rod 46 telescopes within the member 45 and is urged outward by a spring 47. In order to prevent the rod 47 from urging the marker too far outward the shank of the rod 46 is slotted as at 48 and a pin 49 extends through the crank member 45 and through this slot, limiting the movement of the rod 46. It will be obvious that upon a rotation of the shaft 8 the marking device will also be rotated and forced down against the ground, the members 46 yielding as they strike the ground. The marking device may be applied either to one end or both ends of the shaft 8, as desired, and it will be seen that with the marking device and my other attachments I have provided a complete set of attachments for dropping the seed at spaced intervals and marking the place where the seed is dropped.

The operation of this invention will be obvious from what has gone before. Continuous rotation will be communicated to the shaft 8 by the sprocket chain 10 leading from the axle. This will cause the tappet 15 to engage the projecting tappet arm 29 and oscillate the shaft 9 against the force of the spring 27. As soon as the member 15 has escaped from the tappet arm the spring will return the shaft 9 to its original position. This oscillation of the shaft 9 will cause an intermittent reciprocation of the links 34 and the valves connected thereto.

My invention is simple, may be easily manufactured and easily applied, and by the use of these attachments an ordinary corn planter requiring the use of a check row wire may be converted into a wireless check row planter.

While I have shown my attachments as applied to a double corn planter, it will be understood that they can be equally well applied to a single planter. In some planters all of the parts which I have illustrated will not be required. Thus, for instance, the means for returning the dropping shaft to its original position after oscillation will not be necessary in some forms of planters.

Having thus described my invention, what I claim is:

1. In a planter the combination with a rotatable feed shaft, and a rock shaft for controlling the dropping of seed, of a tappet member detachably mounted on the feed shaft, a tappet arm detachably mounted on the rock shaft and intermittently engaged by the tappet member, an arm also mounted upon the rock shaft having perforations at its outer end, a rod passing through said perforations and having a head, a spring disposed between the end of said arm and said head and surrounding the rod, and a fixed member for operatively engaging the end of said rod opposite the spring, said rod being adjustable with relation to the fixed member.

2. In a planter the combination with a rotatable feed shaft and a rock shaft for controlling the dropping of seed, of a tappet arm having a split base detachably engaged over and embracing the rock shaft, means for contracting the split base upon the shaft to hold the tappet arm in position, and a tappet detachably mounted on the feed shaft and comprising a pair of spaced members each formed with a split base adapted to embrace the feed shaft, the spaced members being connected by a rod adapted to intermittently engage with said tappet arm as the feed shaft is rotated, and means for contracting each of said split bases upon the feed shaft.

In testimony whereof I hereunto affix my signature in the presence of two witnesses.

CHARLES W. ZIMMERMAN.

Witnesses:
W. J. CARLIN,
W. S. MILLER.